US006772313B2

(12) United States Patent
Oh

(10) Patent No.: US 6,772,313 B2
(45) Date of Patent: Aug. 3, 2004

(54) AUTOMATIC ADJUSTMENT OF HOST PROTECTED AREA BY BIOS

(75) Inventor: Sang-Min Oh, San Jose, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 365 days.

(21) Appl. No.: 10/029,783

(22) Filed: Oct. 19, 2001

(65) Prior Publication Data

US 2003/0079101 A1 Apr. 24, 2003

(51) Int. Cl.[7] .......................... G06F 12/00; G06F 9/445
(52) U.S. Cl. ........................ 711/173; 711/112; 713/2
(58) Field of Search ................. 711/170–173, 4, 711/111–112; 710/10, 104; 713/1–2, 100; 709/220, 221, 222; 714/38; 360/15, 48, 75

(56) References Cited

U.S. PATENT DOCUMENTS

| 5,966,732 A | * | 10/1999 | Assaf | 711/170 |
| 6,104,555 A | * | 8/2000 | Nam | 360/15 |
| 6,304,965 B1 | * | 10/2001 | Rickey | 713/2 |
| 6,421,747 B1 | * | 7/2002 | Wilson | 710/56 |
| 2002/0129217 A1 | * | 9/2002 | Nichols | 711/173 |
| 2002/0133714 A1 | * | 9/2002 | Sales et al. | 713/200 |

* cited by examiner

Primary Examiner—Denise Tran

(57) ABSTRACT

A method that adjusts the host protected area of a hard disk drive automatically using BIOS during power on self test (POST) by adjusting the start address of the host protected area of the hard disk drive and all service entries in the directory of services. Host protected area physical disk addresses are automatically adjusted by the BIOS when the hard disk drive has a different location from the host protected area used to create the source image of the data placed in the host protected area of the hard disk drive.

6 Claims, 3 Drawing Sheets

| OFFSET | Type | Description |
|---|---|---|
| 0 | Byte | Directory Flag |
| 1 | Byte | Reserved |
| 2-9 | Qword | Service Area Start |
| 10-17 | Qword | Service Area Size |
| 18-21 | Dword | Load Sectors |
| 22-25 | Dword | Load Address |
| 26-27 | Word | Service Area ID |
| 28-59 | Byte | ID String |
| 60-61 | Word | Reserved |
| 62-63 | Word | 16 bit Checksum |

| OFFSET | Type | Description |
|---|---|---|
| 0-1 | Word | Signature = BEEFh |
| 2-3 | Word | BEER size. Shall be 128 |
| 4-5 | Word | Capabilities word |
| 6-9 | Dword | Reported Cylinders |
| 10-13 | Dword | Reported Heads |
| 14-17 | Dword | Reported Sectors |
| 18-21 | Qword | Reported Bytes/Sector |
| 22-29 | Dword | Reported Sectors/Devices |
| 30-33 | Dword | Formatted Cylinders |
| 34-37 | Dword | Formatted Heads |
| 38-41 | Dword | Formatted Sectors |
| 42-45 | Qword | Formatted Bytes/Sector |
| 46-53 | Dword | Formatted Sectors/Device |
| 54-55 | Word | BCD Year |
| 56-57 | Word | Linear Day |
| 58-61 | Dword | Configuration Time Stamp |
| 62 | Byte | Reserved shall be 0 |
| 63 | Byte | Device Index |
| 64-71 | Qword | Host Protected Area Start |
| 72-79 | Qword | Reserved Area Boot Code Address |
| 80-81 | Word | Length of a BEER Directory of Services Entry |
| 84 | Byte | Reserved shall be 0 |
| 85 | Byte | Revision of the standard used to generate this record |
| 86-125 | String | Device Name |
| 126-127 | Word | Word 16 Bit Checksum |

-PRIOR ART-

FIG. 2

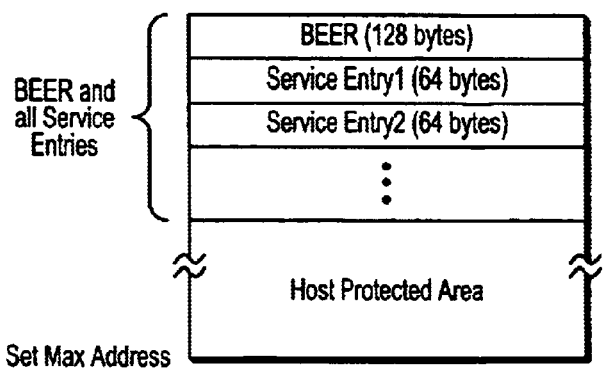

-PRIOR ART-

FIG. 4

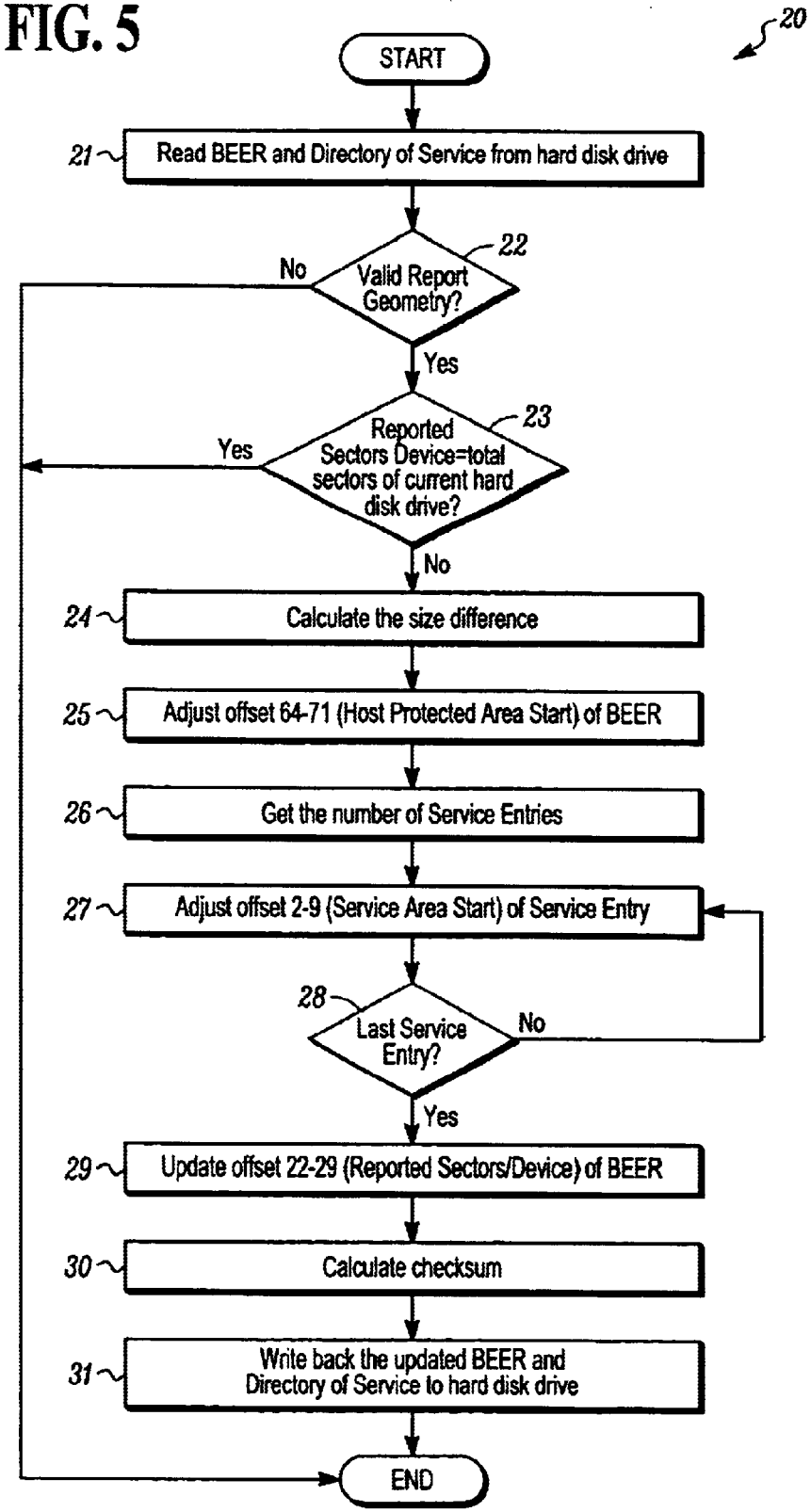

AUTOMATIC ADJUSTMENT OF HOST PROTECTED AREA BY BIOS

BACKGROUND

The present invention relates to computers, and more particularly to a method for automatically adjusting a host protected area using the basic input/output system (BIOS).

The most recently available hard disk drives that support ATA spec 4 or above support a host protected area. This is an area of a hard disk drive's storage capacity that is not normally accessible to a user. The host protected area starts at the maximum address+1 and ends at an address returned by a READ NATIVE MAX ADDRESS command. The start address of the host protected area can be set using a SET MAX ADDRESS command. This is illustrated in FIG. 1, which shows the structure of a hard disk drive having a host protected area.

The Native Max Address sector of the hard disk drive contains the Boot Engineering Extension Record (BEER) and one or more optional Directory of Service Entries. There can be more Service Entries in sectors before the Native Max Address sector. The basic input/output system (BIOS) uses BEER and Service entries to obtain information regarding the host protected area.

FIG. 2 is a chart that shows the Boot Engineering Extension Record (BEER). FIG. 3 is a chart that shows exemplary Directory of Service Entries. FIG. 4 shows an exemplary BEER and Service Entries.

Many computer systems manufacturers wish to have a single source image for the data placed in the host protected area of the hard disk drive. The manufacturers copy that image to the host protected area of hard disk drives having different sizes and manufacturers.

However, even though the data for the host protected area is copied to the end of target hard disk drive by a copy machine or by network copy software and all the data is in the appropriate location for the target hard disk drive, Offset 647 1 (Host Protected Area Start) of the BEER and offset 2–9 (Service Area Start) of the Services Entry contain the physical sector addresses which may not be correct for target hard disk drive. Because there are lots of hard disk copy machines and network installation software, it cannot be guarantees if the host protected area is copied properly and physical sector address fields are correct.

It is an objective of the present invention to provide for a method that automatically adjusts a host protected area using the basic input/output system (BIOS).

SUMMARY OF THE INVENTION

The present invention adjusts the host protected area of a hard disk drive automatically using BIOS during power on self test (POST). In particular, the present invention adjusts the start address of the host protected area of the hard disk drive and adjusts all service entries in the directory of services of the hard disk drive automatically using the BIOS during power on self test. Thus, host protected area physical disk addresses are adjusted automatically by the BIOS during POST when the hard disk drive has a different location from the host protected area used to create the source image of the data placed in the host protected area of the hard disk drive.

To accomplish this, the present invention, and in particular the BIOS software, performs the following steps.

The BIOS software reads the Boot Engineering Extension Record (BEER) and Directory of Service from hard disk drive. The BIOS software then verifies if bit 0 of BEER offset 4–5 (Capabilities word) is set. This bit means that Reported Sector/Device field of the BEER has valid data that is the number of total sectors in the master hard disk drive.

The BIOS software then checks if the master hard disk drive and a target hard disk drive have the same size. This is achieved by comparing the Reported Sector/Device and the Native Max Address+1 of the target hard disk drive.

The size difference is then determined. The size difference=Reported Sector/Device−(Native Max Address+1) if the target hard disk drive has smaller size, or (Native Max Address+1)−Reported Sector/Device if the target hard disk drive has larger size.

The BIOS software adds the size difference to the host protected area Start field in the BEER (offset 64–71). The BIOS software gets the number of Service Entries from BEER offset 80–81. The BIOS software adds the size difference to the Service Area Start field (offset 2–9) of all Service Entries.

The BIOS software then updates the Reported Sectors/Device field of the BEER to the target hard disk drive size (Native Max Address+1). The BIOS software calculates the checksum for the BEER and Service Entries and saves it to the checksum field. The BIOS software then writes the updated BEER and Service Entries to the hard disk drive.

The advantage of the present invention is that computer companies will not need to depend on copy machines or network copy software to adjust sector addresses defining the Host Protected Area when the target hard disk drive has physical sector locations that are different from the source image. Once copy machine or network copy software copies the Host Protected Area to the end of the hard disk drive, and then the BIOS will adjust the Host Protected Area automatically during POST when the computer system is turned on.

BRIEF DESCRIPTION OF THE DRAWINGS

The various features and advantages of the present invention may be more readily understood with reference to the following detailed description taken in conjunction with the accompanying drawing figure, described by way of example, wherein like reference numerals designate like structural elements, and in which:

FIG. 2 is a chart that shows the Boot Engineering Extension Record (BEER);

FIG. 4 shows an exemplary BEER and Service Entries; and

FIG. 5 is a flow diagram that illustrates an exemplary method in accordance with the principles of the present invention.

DETAILED DESCRIPTION

Figures 1, 3:
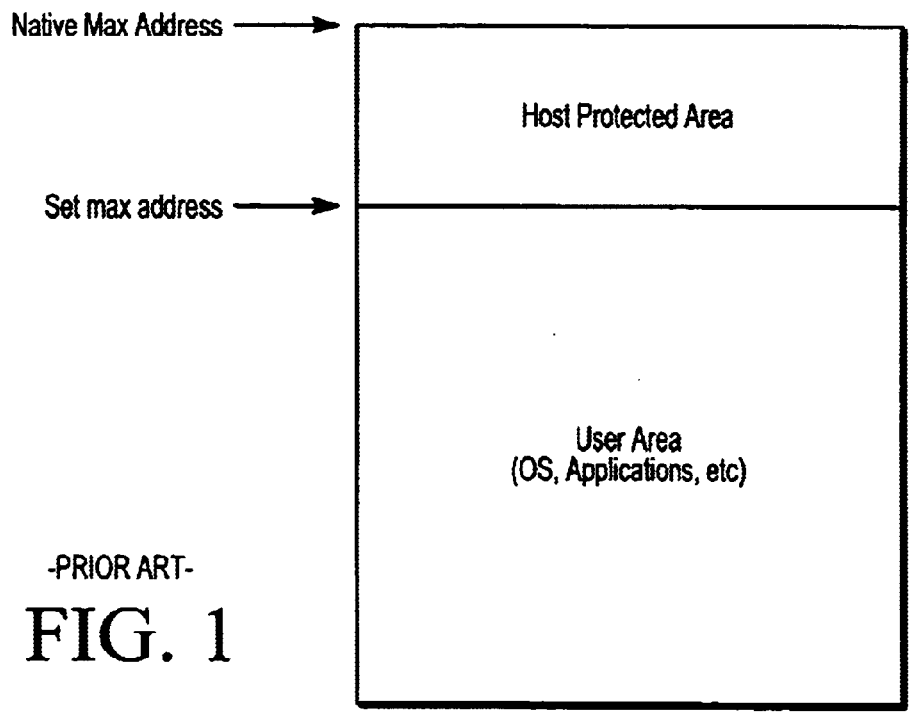
FIG. 1 shows the structure of a hard disk drive having a host protected area.
FIG. 3 is a chart that shows exemplary Directory of Service Entries.

Referring to FIG. 5, it is a flow diagram that illustrates an exemplary method 20 in accordance with the principles of the present invention. The method 20, implemented in basic input/output system (BIOS) software, performs the following steps.

The BEER and Directory of Service are read 21 from a current or target hard disk drive. It is then verified 22 if there is a valid report geometry for the target hard disk drive. This is verified 22 if bit 0 of BEER offset 4–5 (Capabilities word) is set. This bit indicates that Reported Sector/Device field of the BEER has valid data that is the number of total sectors in a master hard disk drive.

Then the master hard disk drive and the current or target hard disk drive are checked 23 to determine if they have the same size. This is achieved by comparing the Reported Sector/Device and the Native Max Address+1 of the current hard disk drive.

The size difference between the master and target hard disk drives is then calculated 24. The size difference= Reported Sector/Device–(Native Max Address+1), if the target hard disk drive has smaller size. Alternatively, the size difference=(Native Max Address+1)–Reported Sector/ Device, if target hard disk drive has larger size.

The size difference is then added 25 to the host protected area Start field in the BEER (offset 64–71). The number of Service Entries is retrieved 26 from BEER offset 80–81. The size difference is added 27 to the Service Area Start field (offset 2–9) of all Service Entries (by looping 28 through all Service Entries).

The BIOS software updates 29 the Reported Sectors/ Device field of the BEER to the target hard disk drive size (Native Max Address+1). The BIOS software calculates 30 the checksum for the BEER and Service Entries and saves 31 it to the checksum field. The updated BEER and Service Entries are then written 33 to the hard disk drive.

The advantage of the present invention is that computer companies will not need to depend on copy machines or network copy software to adjust sector addresses defining the Host Protected Area when the target hard disk drive has physical sector locations that are different from the source image. Once copy machine or network copy software copies the Host Protected Area to the end of the hard disk drive, and then the BIOS will adjust the Host Protected Area automatically during POST when the computer system is turned on.

Thus, a method that automatically adjusts a host protected area of a hard disk drive using the basic input/output system (BIOS) has been disclosed. It is to be understood that the described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A method that automatically adjusts a host protected area of a target hard disk drive relative to a master hard disk drive using a basic input/output system (BIOS), the method comprising the steps of:

reading a Boot Engineering Extension Record (BEER) and Directory of Service from the target hard disk drive;

verifying if there is a valid report geometry for the target hard disk drive;

determining if the master hard disk drive and the target hard disk drive have a same size;

calculating the size difference between the master and target hard disk drives;

adding the size difference to the host protected area Start field in the BEER;

retrieving a number of Service Entries from the BEER;

adding the size difference to a Service Area Start field of all Service Entries updating a Reported Sectors/Device field of the BEER to the target hard disk drive size;

calculating a checksum for the BEER and Service Entries;

saving the calculated checksum to a checksum field; and writing the updated BEER and Service Entries to the target hard disk drive.

2. The method recited in claim 1 wherein the step of verifying if there is a valid report geometry verifies if bit 0 of BEER offset 4–5 is set.

3. The method recited in claim 1 wherein bit 0 of BEER offset 4–5 indicates that the Reported Sector/Device field of the BEER has valid data.

4. The method recited in claim 1 wherein the step of determining if the master hard disk drive and the target hard disk drive have the same size comprises the step of comparing the Reported Sector/Device and Native Max Address+1 of the target hard disk drive.

5. The method recited in claim 1 wherein the size difference=Reported Sector/Device–(Native Max Address+ 1), if the target hard disk drive has smaller size.

6. The method recited in claim 1 wherein the size difference=(Native Max Address+1)–Reported Sector/ Device, if target hard disk drive has larger size.

\* \* \* \* \*